United States Patent
Moriya et al.

(10) Patent No.: US 10,639,997 B2
(45) Date of Patent: May 5, 2020

(54) CONTROL APPARATUS OF VEHICLE

(71) Applicant: SUBARU CORPORATION, Tokyo (JP)

(72) Inventors: Fumiyuki Moriya, Tokyo (JP); Hiroshi Ienaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 231 days.

(21) Appl. No.: 15/787,585

(22) Filed: Oct. 18, 2017

(65) Prior Publication Data

US 2018/0126852 A1 May 10, 2018

(30) Foreign Application Priority Data

Nov. 7, 2016 (JP) .................................. 2016-216926

(51) Int. Cl.
  *B60L 9/00* (2019.01)
  *B60L 3/00* (2019.01)
  *B60L 15/20* (2006.01)

(52) U.S. Cl.
  CPC ......... *B60L 3/0023* (2013.01); *B60L 15/2054* (2013.01); *B60L 15/2072* (2013.01);
  (Continued)

(58) Field of Classification Search
  CPC ............... B60L 3/0023; B60L 15/2054; B60L 15/2072; B60L 2240/461; B60L 2240/421;
  (Continued)

(56) References Cited

U.S. PATENT DOCUMENTS

2005/0274560 A1* 12/2005 Wakao .................... B60L 3/102
  180/197
2012/0215392 A1* 8/2012 Hashimoto ........... B60W 10/02
  701/22
(Continued)

FOREIGN PATENT DOCUMENTS

JP      2006-238560 A     9/2006
JP      2008-167623 A     7/2008
          (Continued)

OTHER PUBLICATIONS

Japanese Office Action, dated Sep. 4, 2018, in Japanese Application No. 2016-216926 and English Translation thereof.

*Primary Examiner* — Shardul D Patel
(74) *Attorney, Agent, or Firm* — McGinn IP Law Group, PLLC (57) ABSTRACT

A control apparatus of a vehicle that is provided with a drive wheel, a drive unit configured to generate, on a basis of a torque command, power directed to running, and a power transmitter configured to transmit the power derived from the drive unit to the drive wheel. The control apparatus is mounted on the vehicle and includes a resonance controller and a resonance switcher. The resonance controller is configured to output the torque command, and control resonance of the power transmitter by utilizing the torque command. The resonance switcher is configured to switch a state of the resonance controller between a resonance-restraining state that restrains the resonance and a resonance-generating state that generates the resonance.

20 Claims, 5 Drawing Sheets

(52) U.S. Cl.
CPC ....... *B60L 2220/42* (2013.01); *B60L 2240/12* (2013.01); *B60L 2240/421* (2013.01); *B60L 2240/423* (2013.01); *B60L 2240/461* (2013.01); *B60L 2240/465* (2013.01); *B60L 2240/486* (2013.01); *B60L 2250/26* (2013.01); *B60L 2260/28* (2013.01); *B60L 2260/42* (2013.01); *B60Y 2200/91* (2013.01); *B60Y 2300/192* (2013.01); *B60Y 2300/20* (2013.01); *Y02T 10/7275* (2013.01)

(58) Field of Classification Search
CPC ............. B60L 2220/42; B60L 2250/26; B60L 2240/486; B60L 2240/12; B60L 2240/423; B60L 2240/465; B60L 2260/28; B60L 2260/42; Y02T 10/7275; B60Y 2300/20; B60Y 2200/91; B60Y 2300/192

USPC .................. 701/22; 318/400.23; 180/65.265; 903/930

See application file for complete search history.

(56) References Cited

U.S. PATENT DOCUMENTS

| | | | |
|---|---|---|---|
| 2012/0235612 A1* | 9/2012 | Akashi | B60L 15/20 318/400.23 |
| 2014/0366682 A1* | 12/2014 | Murata | B60W 10/02 74/572.2 |
| 2015/0180386 A1* | 6/2015 | Enoki | H02P 6/10 318/400.23 |

FOREIGN PATENT DOCUMENTS

| | | |
|---|---|---|
| JP | 2011-205799 A | 10/2011 |
| JP | 2012-035692 A | 2/2012 |
| WO | WO 03/095261 A1 | 11/2003 |

\* cited by examiner

CONTROL APPARATUS OF VEHICLE

CROSS-REFERENCE TO RELATED APPLICATIONS

The present application claims priority from Japanese Patent Application No. 2016-216926 filed on Nov. 7, 2016, the entire contents of which are hereby incorporated by reference.

BACKGROUND

The technology relates to a control apparatus of a vehicle which controls power to be generated by a drive unit.

An electrical vehicle such as an electric vehicle (EV) and a hybrid electric vehicle (HEV) is driven by a motor that is directed to running. The power derived from the running-use motor is transmitted to drive wheels through a transmission mechanism such as a transmission and a drive shaft. The transmission mechanism has a natural frequency with respect to a vibration in a rotation direction of torque. Hence, the transmission mechanism resonates and thus generates a large vibration in the rotation direction of the torque when a resonance frequency component that is synchronized with the natural frequency is included in the power to be transmitted. To address this, in general, the typical electrical vehicle performs a control that restrains the resonance of the transmission mechanism by attenuating the resonance frequency component when the component is included in the power generated by the running-use motor.

For example, Japanese Unexamined Patent Application Publication (JP-A) No. 2011-205799 discloses, as a prior art related to one implementation of the technology, a technique that detects a factor such as an abnormal vibration by combining a torque command with a high-frequency vibration waveform and supplying a motor controller with the combined torque command. JP-A No. 2008-167623 discloses, as a prior art related to one implementation of the technology, a technique that prevents occurrence of a slip by increasing a torque command value while causing oscillation in the torque command value when requested torque increases beyond a predetermined rate.

SUMMARY

For any vehicle such as a two-wheel-drive electric vehicle, a two-wheel-drive engine vehicle, and a four-wheel-drive engine vehicle, as well as an above-described four-wheel-drive electric vehicle in which front wheels and rear wheels are independent from each other, it is desirable that, in a situation where the vehicle becomes unable to start due to a rough road or any other situation, a possibility of escaping from the situation and starting the vehicle be increased.

It is desirable to provide a control apparatus of a vehicle which, in a situation where the vehicle becomes unable to start due to a rough road or any other situation, makes it possible to increase a possibility of escaping from the situation and starting the vehicle.

An aspect of the technology provides a control apparatus of a vehicle. The vehicle is provided with a drive wheel, a drive unit configured to generate, on a basis of a torque command, power directed to running, and a power transmitter configured to transmit the power derived from the drive unit to the drive wheel. The control apparatus is mounted on the vehicle. The control apparatus includes: a resonance controller configured to output the torque command, and control resonance of the power transmitter by utilizing the torque command; and a resonance switcher configured to switch a state of the resonance controller between a resonance-restraining state that restrains the resonance and a resonance-generating state that generates the resonance.

An aspect of the technology provides a control apparatus of a vehicle. The vehicle is provided with a drive wheel, a drive unit configured to generate, on a basis of a torque command, power directed to running, and a power transmitter configured to transmit the power derived from the drive unit to the drive wheel. The control apparatus is mounted on the vehicle. The control apparatus includes circuitry configured to output the torque command, controls resonance of the power transmitter by utilizing the torque command, and switch a state of the control performed on the resonance of the power transmitter between a resonance-restraining state that restrains the resonance and a resonance-generating state that generates the resonance.

BRIEF DESCRIPTION OF THE DRAWINGS

(A) of FIG. 4 is a timing chart illustrating an example of motor torque upon generation of resonance, (B) of FIG. 4 is a timing chart illustrating an example of inertia torque upon the generation of the resonance, and (C) of FIG. 4 is a timing chart illustrating an example of drive force of the vehicle upon the generation of the resonance.

DETAILED DESCRIPTION

In the following, a description is given in detail of one implementation of the technology with reference to the accompanying drawings.

Figure 1:
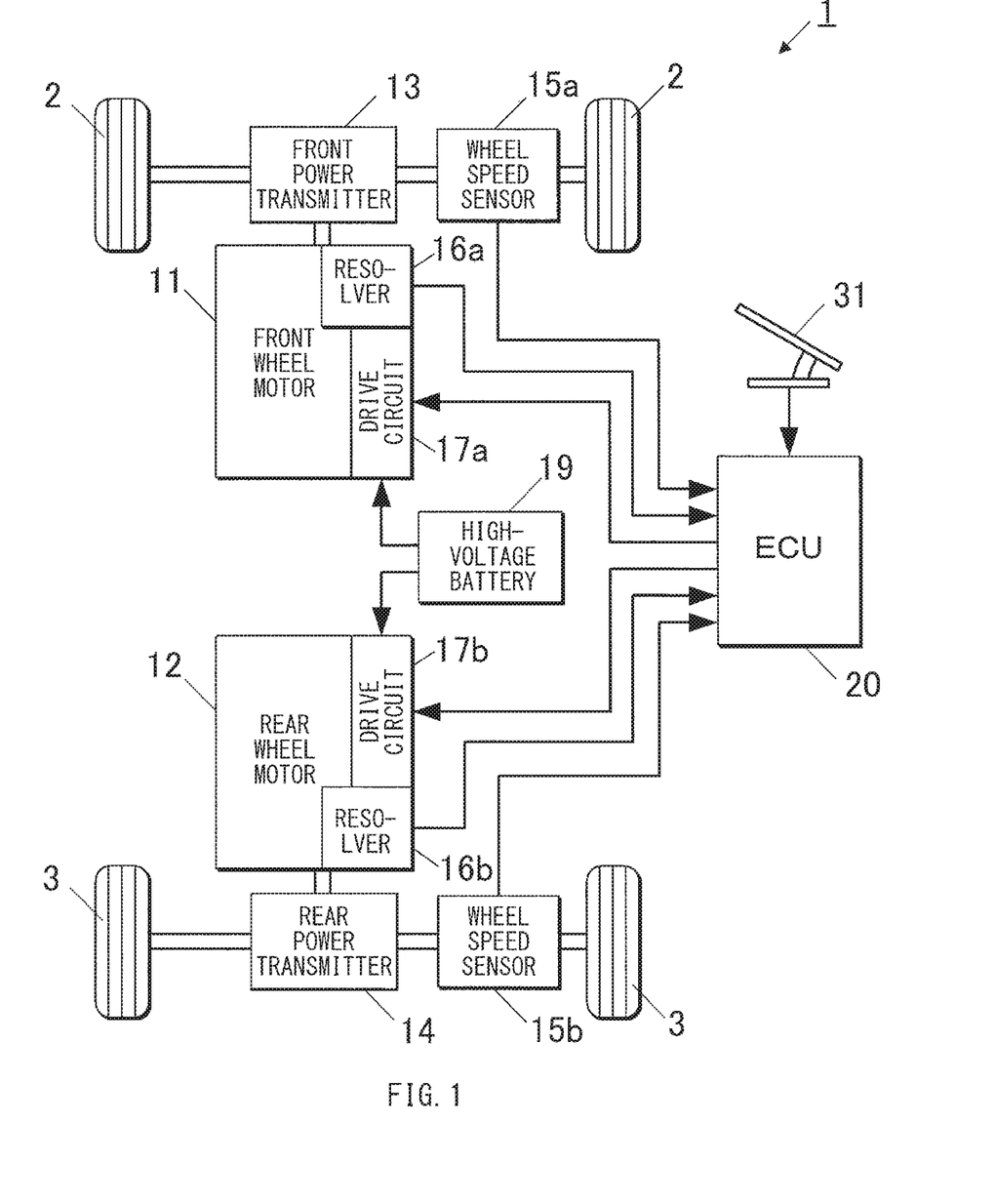
FIG. 1 illustrates an example of a configuration of a vehicle provided with a control apparatus of the vehicle according to one implementation of the technology.

FIG. 1 illustrates an example of a configuration of a vehicle provided with a control apparatus of the vehicle according to one implementation of the technology.

Referring to FIG. 1, a vehicle 1 according to one implementation of the technology may be an electric vehicle (EV). The vehicle 1 may include a plurality of front wheels 2, a plurality of rear wheels 3, a front wheel motor 11, a rear wheel motor 12, a front power transmitter 13, a rear power transmitter 14, and a driving operation device 31. The vehicle 1 may also include wheel speed sensors 15a and 15b, resolvers (or "angle sensors") 16a and 16b, drive circuits 17a and 17b, a high-voltage battery 19, unillustrated sensors that detect vehicle states, and an ECU (electric control unit) 20. Non-limiting examples of the unillustrated sensor may include an accelerometer.

In one implementation, the front wheels 2 may serve as a "drive wheel" or a "first drive wheel". In one implementation, the rear wheels 3 may serve as the "drive wheel" or a "second drive wheel". In one implementation, the front wheel motor 11 may serve as a "first drive unit" or a "drive unit". In one implementation, the rear wheel motor 12 may serve as a "second drive unit" or the "drive unit". In one implementation, the front power transmitter 13 may serve as a "first power transmitter" or a "power transmitter". In one implementation, the rear power transmitter 14 may serve as a "second power transmitter" or the "power transmitter". In one implementation, the ECU 20 may serve as a "control apparatus".

The front wheel motor 11 may be driven by a control performed by the ECU 20, and may generate power directed to the front wheels 2. The front wheel motor 11 may drive the front wheels 2 by means of electric power of the high-voltage battery 19 supplied through the drive circuit 17a. A rotation speed of the front wheel motor 11 may be detected by the resolver 16a. The resolver 16a sends an output on the detected rotation speed of the front wheel motor 11 to the ECU 20.

The front power transmitter 13 may transmit the power derived from the front wheel motor 11 to the front wheels 2. The front power transmitter 13 may include a transmission, a differential gear, and a drive shaft. The drive shaft may include a drive shaft that couples elements of the front power transmitter 13 together, and a drive shaft (may also be referred to as an "axle shaft") coupled to the front wheels 2. The front power transmitter 13 has a natural frequency with respect to a motion in a rotation direction generated by torque. For example, the front power transmitter 13 resonates when a vibration that is in the rotation direction and synchronized with the natural frequency is applied to an input shaft, generating a large vibration in the rotation direction from the input shaft to an output shaft. In the following, a frequency component in synchronization with the natural frequency is referred to as a "resonance frequency component".

The rear wheel motor 12 may be driven by the control performed by the ECU 20, and may generate power directed to the rear wheels 3. The rear wheel motor 12 may drive the rear wheels 3 by means of the electric power of the high-voltage battery 19 supplied through the drive circuit 17b. A rotation speed of the rear wheel motor 12 may be detected by the resolver 16b. The resolver 16b sends an output on the detected rotation speed of the rear wheel motor 12 to the ECU 20.

The rear power transmitter 14 may transmit the power derived from the rear wheel motor 12 to the rear wheels 3. The rear power transmitter 14 may include a transmission, a differential gear, and a drive shaft. The drive shaft may include a drive shaft that couples elements of the rear power transmitter 14 together, and a drive shaft (may also be referred to as an "axle shaft") coupled to the rear wheels 3. The rear power transmitter 14 has a natural frequency with respect to a motion in a rotation direction generated by torque. For example, the rear power transmitter 14 resonates when a vibration that is in the rotation direction and synchronized with the natural frequency is applied to an input shaft, generating a large vibration in the rotation direction from the input shaft to an output shaft. The resonance frequency component of the front power transmitter 13 and the resonance frequency component of the rear power transmitter 14 may be different from each other, or may be substantially the same as each other.

The wheel speed sensors 15a and 15b may respectively detect a rotation speed of the front wheels 2 and a rotation speed of the rear wheels 3. Outputs of the respective wheel speed sensors 15a and 15b and outputs of the unillustrated various sensors that detect the vehicle states may be sent to the ECU 20.

The driving operation device 31 may include, in addition to an accelerator pedal, a device such as a brake pedal, a steering wheel, and a shift lever (or a shift switch) directed to shifting. Each amount of operation made to the driving operation device 31 or each operation position of the driving operation device 31 may be sent to the ECU 20 as a driving operation signal as illustrated in FIG. 2.

The ECU 20 may be a non-limiting example of the control apparatus mounted on the vehicle 1. The ECU 20 may perform a control on traveling of the vehicle 1 by driving the front wheel motor 11 and the rear wheel motor 12 on the basis of a driving operation. The ECU 20 also performs a control on the resonance of each of the front power transmitter 13 and the rear power transmitter 14.

Figure 2:
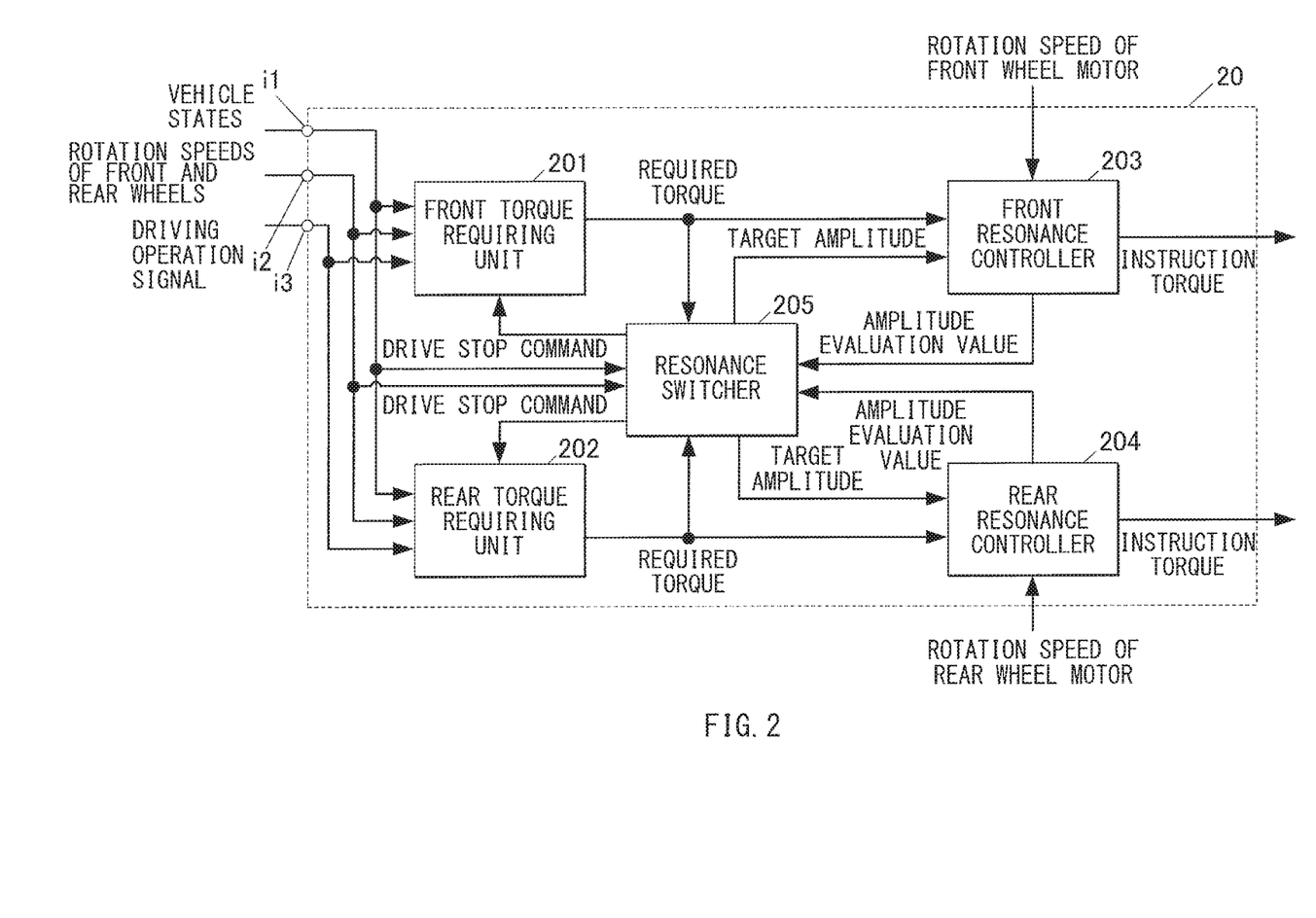
FIG. 2 is a functional block diagram illustrating example details of an ECU illustrated in FIG. 1.

FIG. 2 is a functional block diagram illustrating example details of the ECU 20 according to one implementation of the technology.

The ECU 20 may include a plurality of functional blocks such as a front torque requiring unit 201, a rear torque requiring unit 202, a front resonance controller 203, a rear resonance controller 204, and a resonance switcher 205. In one implementation, the front resonance controller 203 may serve as a "first resonance controller" or a "resonance controller". In one implementation, the rear resonance controller 204 may serve as a "second resonance controller" or the "resonance controller". In one implementation, the resonance switcher 205 may serve as any one or more of a "resonance switcher", a "returning processor", and a "start determiner".

The ECU 20 may be a microcomputer that includes a central processing unit (CPU), a nonvolatile memory that stores a control program, a random access memory (RAM) directed to working, and an input-output (I/O) circuit that performs inputting and outputting of signals. The ECU 20 may include a digital circuit or an analog circuit that achieves a specific function. The ECU 20 may achieve any one or more of the plurality of functional blocks described above on the basis of cooperation between any software to be implemented by the CPU and any hardware such as the I/O circuit and the digital circuit (or the analog circuit).

The ECU 20 may receive, through input parts i1 to i3, pieces of information on the rotation speeds of the front wheels 2 and the rear wheels 3 as the outputs derived from the wheel speed sensors 15a and 15b, pieces of information on the vehicle states outputted from the various sensors including the accelerometer, and the driving operation signal derived from the driving operation device 31.

The front torque requiring unit 201 and the rear torque requiring unit 202 may respectively calculate, on the basis of the inputs described above, torque directed to the front wheels 2 and torque directed to the rear wheels 3 that are both based on the vehicle states and the driving operation. Further, the front torque requiring unit 201 may convert the thus-calculated torque into output torque of the front wheel motor 11, and output a value obtained as a result of the conversion as required torque. Similarly, the rear torque requiring unit 202 may convert the thus-calculated torque into output torque of the rear wheel motor 12, and output a value obtained as a result of the conversion as required torque.

The front resonance controller 203 may control the resonance of the front power transmitter 13 by utilizing instruction torque. In one specific but non-limiting implementation, the front resonance controller 203 may so correct the required torque that the resonance of the front power transmitter 13 is restrained or generated, and may output torque obtained as a result of the correction as the instruction torque. The instruction torque may be sent to the drive circuit 17a. The drive circuit 17a may so drive the front wheel motor 11 that the power directed to running is outputted on the basis of the instruction torque. In one implementation, the instruction torque may serve as a "torque command". In one implementation, the required torque may serve as a "torque command before correction".

The front resonance controller 203 may receive the required torque directed to the front wheel motor 11, target amplitude of the resonance frequency component, and the rotation speed of the front wheel motor 11 (i.e., the output derived from the resolver 16a). The front resonance controller 203 may be placed in a resonance-restraining state in which a process of restraining the resonance is performed when the target amplitude is close to zero. When the target amplitude takes a value that is larger than zero, the front resonance controller 203 may be placed in a resonance-generating state in which a process is so performed that the resonance of the target amplitude is generated. A description on the front resonance controller 203 is given later in greater detail.

The rear resonance controller 204 may be similar to the front resonance controller 203 in configuration and control performed. The front resonance controller 203 may perform the control of the resonance on the front wheels 2, the front wheel motor 11, and the front power transmitter 13, whereas the rear resonance controller 204 may perform the control of the resonance on the rear wheels 3, the rear wheel motor 12, and the rear power transmitter 14.

The resonance switcher 205 may receive the pieces of information on the vehicle states, the pieces of information on the rotation speeds of the front wheels 2 and the rear wheels 3, the required torque directed to the front wheel motor 11, the required torque directed to the rear wheel motor 12, an amplitude evaluation value of the resonance of the front wheels 2, and an amplitude evaluation value of the resonance of the rear wheels 3. The resonance switcher 205 may switch the state of the front resonance controller 203 or the state of the rear resonance controller 204 on the basis of the received inputs described above. The resonance switcher 205 may further output, on the basis of a predetermined condition, a drive stop command that causes the front torque requiring unit 201 to stop driving of the front wheel motor 11 and a drive stop command that causes the rear torque requiring unit 202 to stop driving of the rear wheel motor 12. A description on the resonance switcher 205 is given later in greater detail.

[Details of Resonance Controller]

Figure 3:
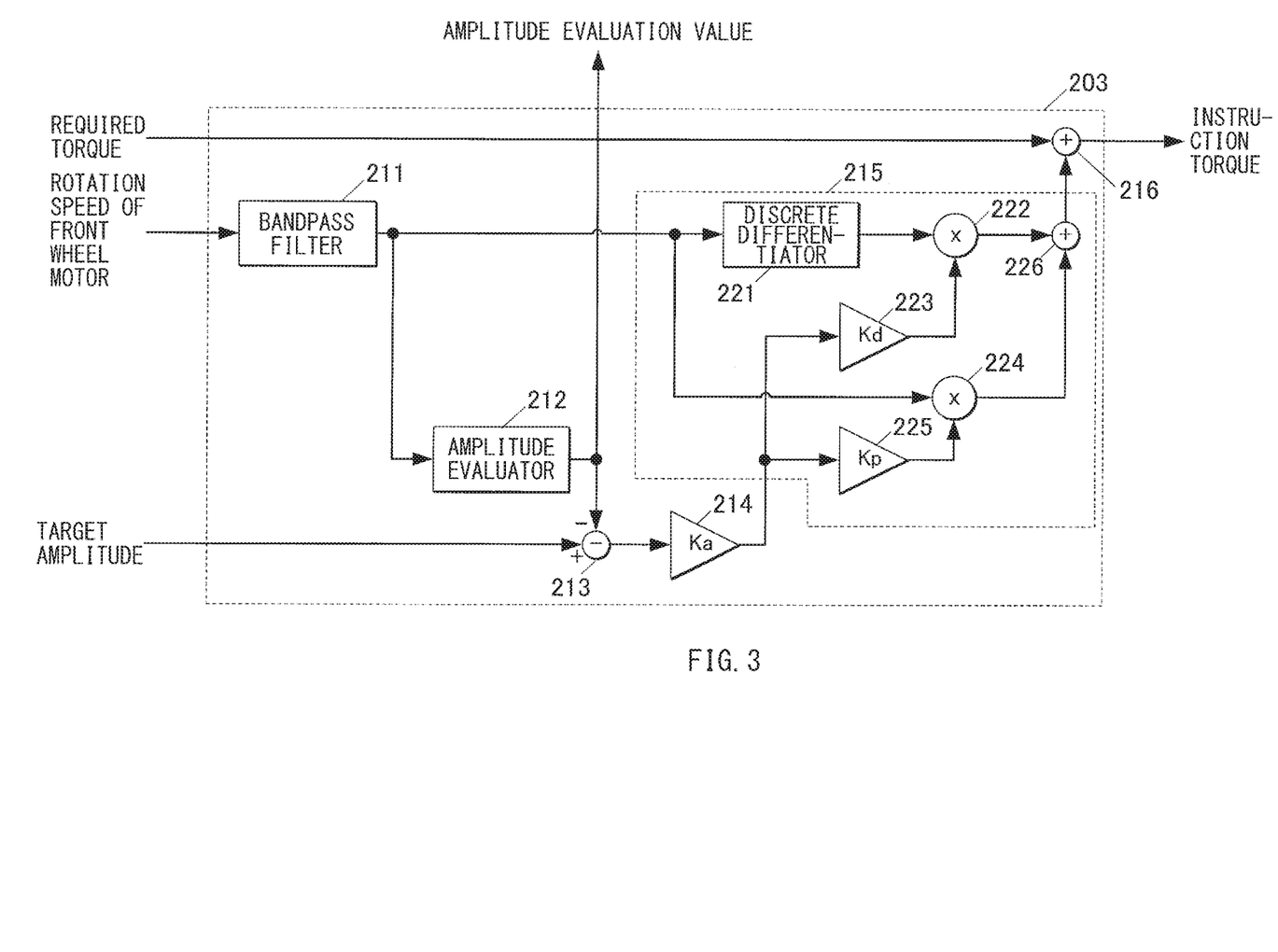
FIG. 3 is a circuit diagram illustrating example details of a front resonance controller illustrated in FIG. 2.

FIG. 3 is a circuit diagram illustrating example details of the front resonance controller 203.

Referring to FIG. 3, the front resonance controller 203 may include a bandpass filter 211, an amplitude evaluator 212, a subtractor 213, an amplifier 214, a proportional derivative (PD) control circuit 215, and an adder 216. In one implementation, the amplitude evaluator 212 may serve as an "evaluator".

The bandpass filter 211 may allow the resonance frequency component of the front power transmitter 13, contained in the signal on the rotation speed of the front wheel motor 11, to pass therethrough, and may thus allow a signal on the resonance frequency component to be outputted to any device downstream of the bandpass filter 211. In the following, the signal on the resonance frequency component outputted from the bandpass filter 211 is referred to as a "front resonance signal". For example, the bandpass filter 211 may be a digital filter or any other suitable filter that allows for selective passing of the resonance frequency component.

The PD control circuit 215 may perform feedback of a proportional component and a derivative component of the front resonance signal to thereby perform a feedback control that causes the front resonance signal to be converged. A proportional gain Kp and a derivative gain Kd may be stored in the PD control circuit 215. The proportional gain Kp may determine a magnitude of a signal of the proportional component to be subjected to the feedback. The derivative gain Kd may determine a magnitude of a signal of the derivative component to be subjected to the feedback. An optimal value may be set in advance for each of the proportional gain Kp and the derivative gain Kd such that the front resonance signal is converted promptly. For example, such optimal values may be determined by simulation, experiment, etc., upon designing.

The PD control circuit 215 may include a discrete differentiator 221, amplifiers 223 and 225, a multiplier 222, and an adder 226. The amplifiers 223 and 225 each may output the preset optimal value of corresponding one of the proportional gain Kp and the derivative gain Kd upon restraining of the resonance. The discrete differentiator 221 may perform a differential operation of the front resonance signal. The multiplier 222 may multiply a result of the operation of the discrete differentiator 221 by the derivative gain Kd, and output a value obtained as a result of the multiplication, i.e., output the derivative component of the front resonance signal. The multiplier 224 may multiply the front resonance signal by the proportional gain Kp, and output a value obtained as a result of the multiplication, i.e., output the proportional component of the front resonance signal. The adder 226 may add the proportional component and the derivative component of the front resonance signal, and output a value obtained as a result of the addition as a feedback signal. The adder 216 may add the feedback signal to the required torque to generate the instruction torque.

The PD control circuit 215 may vary the proportional gain Kp and the derivative gain Kd from their optimal values to allow the front resonance signal to be increased or to allow the convergence of the front resonance signal to be delayed. A base gain Ka as an input of each of the amplifiers 223 and 225 may be varied to cause the proportional gain Kp and the derivative gain Kd to be varied from their optimal values.

Note that a PD control (a proportional derivative control) is applied to the front resonance controller 203 in one implementation illustrated in FIG. 3. Applying a control other than a control that performs feedback of an integral component, such as a proportional integral derivative control (a PID control), makes it possible to restrain the instruction torque from exceeding the required torque and allow for easier control of the instruction torque such that the instruction torque does not exceed upper limit torque of the front wheel motor 11. In an alternative implementation, however, the PID control or any other control that involves the feedback of the integral component may be applied to the front resonance controller 203, depending on a method of setting the required torque.

The amplitude evaluator 212 may evaluate amplitude of the front resonance signal, and output an evaluated value as the amplitude evaluation value. In one implementation, the amplitude may be evaluated by calculating a difference between a maximum value and a minimum value of the front resonance signal that has been subjected to a removal of a noise component. The noise component may be removed by a method such as a moving average. In an alternative implementation, any other method may be employed that allows for the evaluation of the amplitude. The amplitude evaluation value may be outputted not only to the subtractor 213 but also to the resonance switcher 205 as illustrated in FIG. 2.

The subtractor 213 may calculate a difference between the amplitude evaluation value and the target amplitude that is outputted from the resonance switcher 205, and output the calculated difference to the amplifier 214.

The amplifier 214 may generate the base gain Ka. The base gain Ka may vary the proportional gain Kp and the derivative gain Kd of the PD control circuit 215 at the same rate. The base gain Ka may be varied in accordance with the output of the subtractor 213. In one implementation, the amplifier 214 may set a value of the base gain Ka to "1" when an input value supplied thereto is equal to or less than zero, and may so set the value of the base gain Ka that the value of the base gain Ka is varied to be greater than "1" with an increase in the input value. The amplifiers 223 and 225 each may have a gain that is set to the optimal value of corresponding one of the proportional gain Kp and the derivative gain Kd.

With this configuration, when the target amplitude is zero, the base gain Ka may be set to "1" and both the proportional gain Kp and the derivative gain Kd may be set to their respective optimal values. In this case, the PD control circuit 215 may perform such a feedback control that causes the front resonance signal to be converged promptly.

In contrast, the base gain Ka may be increased and both the proportional gain Kp and the derivative gain Kd may be increased from their respective optimal values, when the target amplitude increases to any value in a state in which the front resonance signal is converged. In this case, the PD control circuit 215 may perform such a feedback control that causes the front resonance signal to be increased. Further, when the amplitude evaluation value approaches the target amplitude with the increase in the front resonance signal, the input value of the amplifier 214 varies toward zero and the base gain Ka varies toward "1" as well. As a result, the control performed by the PD control circuit 215 may be varied to cause the front resonance signal to be converged. Hence, setting the target amplitude that is other than zero makes it possible to achieve the feedback control that generates the front resonance signal to the extent that the amplitude evaluation value does not exceed the target amplitude.

The rear resonance controller 204 may have a configuration similar to the configuration of the front resonance controller 203. Accordingly, the rear resonance controller 204 will not be described in detail. In other words, the resonance frequency component of the front power transmitter 13 and the front resonance signal that passes through the bandpass filter 211 according to the front resonance controller 203 are respectively read as the resonance frequency component of the rear power transmitter 14 and a rear resonance signal that passes through the bandpass filter 211 according to the rear resonance controller 204.

Figure 4:
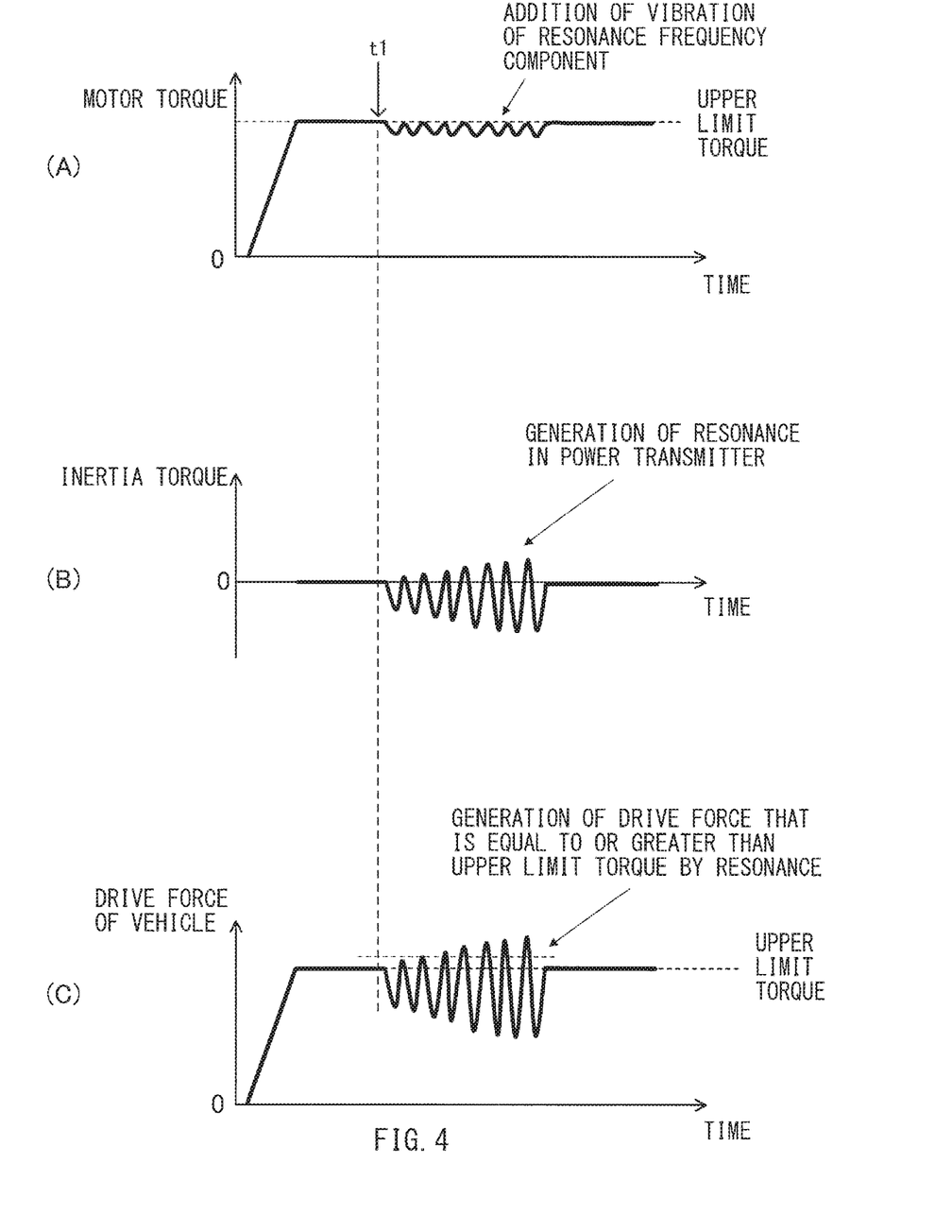

A description is given next, with reference to (A) to (C) of FIG. 4, of an operation of the vehicle 1 when a control that generates the resonance is performed in a situation in which the front wheels 2 rock due to a rough road or any other condition that cause rocking of any wheel. (A) to (C) of FIG. 4 are timing charts respectively illustrating an example of motor torque of the front wheel motor 11, an example of inertia torque of the front power transmitter 13, and an example of drive force of the vehicle 1 that are upon the generation of the resonance.

Referring to (A) of FIG. 4, when the target amplitude that is larger than zero is set for the front resonance controller 203 in a state in which the motor torque has reached up to the upper limit torque (timing t1), the PD control circuit 215 may perform the feedback control that generates the front resonance signal to the extent that the amplitude evaluation value does not exceed the target amplitude. Thus, the vibration of the resonance frequency component is so added to the instruction torque as not to exceed the upper limit torque. As a result, the motor torque to which relatively-small amplitude and the vibration of the resonance frequency component are added is outputted from the front wheel motor 11.

The motor torque outputted from the front wheel motor 11 appears as the inertia torque that causes, in the case where the front wheels 2 rock, a strain in each part of the front power transmitter 13 in the rotation direction of the torque. Further, the vibration, in the motor torque, at a resonance frequency of the front power transmitter 13 causes the front power transmitter 13 to resonate, increasing amplitude of the inertia torque as illustrated in (B) of FIG. 4.

Hence, torque, in which the motor torque illustrated in (A) of FIG. 4 having been transmitted through the front power transmitter 13 and the inertia torque illustrated in (B) of FIG. 4 are added, is generated for the front wheels 2. As illustrated in (C) of FIG. 4, the thus-generated torque contains a portion that vibrates at the resonance frequency, which reaches a level that exceeds the upper limit torque.

Generating the drive force illustrated in (C) of FIG. 4 for the vehicle 1 possibly allows the vehicle 1 to move slightly, in an example case where the vehicle 1 is stuck on the rough road and torque is not transmitted to the rear wheels 3 due to a slip or any other factor, and where the vehicle 1 does not move even when the upper limit torque is applied to the front wheels 2. Such a slight movement of the vehicle 1 varies respective points at which the front wheels 2 and the rear wheels 3 are in touch with the ground, improving the slip of the rear wheels 3 and thereby increasing a possibility that the vehicle 1 escapes from the rough road owing to a combination of the drive force derived from the front wheels 2 and the drive force derived from the rear wheels 3.

[Resonance Control Process]

Figure 5:
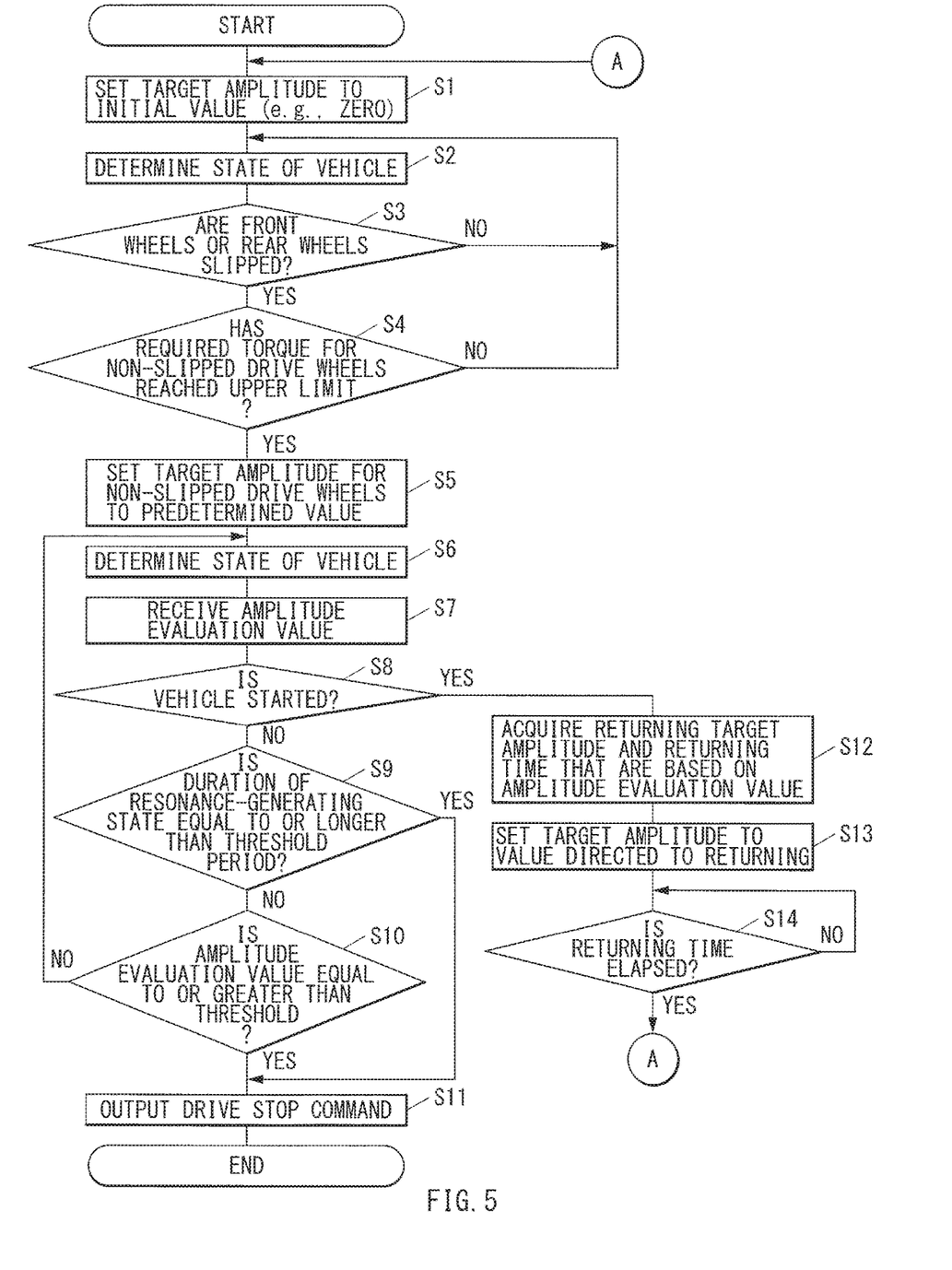
FIG. 5 is a flowchart illustrating an example of a procedure for a resonance control process performed by a resonance switcher illustrated in FIG. 2.

A description is given next, with reference to FIG. 5, of a resonance control process that switches the state of operation of the front resonance controller 203 or the rear resonance controller 204. FIG. 5 is a flowchart illustrating an example of a procedure for the resonance control process performed by the resonance switcher 205.

The resonance control process may be initiated, for example, upon start-up of an electric component of the vehicle 1. When the resonance control process is initiated, the resonance switcher 205 may first set an initial value for each of the target amplitudes of the respective front resonance controller 203 and the rear resonance controller 204 (step S1). The initial value may be "0" (zero), for example. Setting the target amplitudes to their initial values places the front resonance controller 203 and the rear resonance controller 204 in the resonance-restraining state. Hence, the process is performed that restrains the resonance frequency component included in the required torque.

Thereafter, the resonance switcher 205 may determine a state of the vehicle 1 on the basis of the pieces of information on the vehicle states and the pieces of information on the rotation speeds of the front wheels 2 and the rear wheels 3 (step S2). Thereafter, the resonance switcher 205 may make a determination as to whether the front wheels 2 or the rear wheels 3 slip upon the stop of the vehicle 1 (step S3). The resonance switcher 205 may return the process to the step S2 when a result of the determination made in the step S3 is NO (step S3: NO). When the result of the determination made in the step S3 is YES (step S3: YES), the resonance switcher 205 may make a determination as to whether the required torque of the front wheels 2 or the rear wheels 3 which do not involve the slip (hereinafter referred to as "non-slipped drive wheels") reaches the upper limit torque (step S4). Note that the upper limit torque may be set as appropriate to a value that has a margin. For example, the upper limit torque may be set at a value that is 80% of the maximum rating. When a result of the determination made in the step S4 is NO (step S4: NO), the resonance switcher 205 may return the process to the step S2.

Note that the steps from S2 to S4 are a loop process. The resonance switcher 205 may terminate the loop process and allow the process to proceed to step S5 when the result of the determination made in the step S3 and the result of the determination made in the step S4 are both YES (step S3: YES and step S4: YES). A state where both the result of the determination made in the step S3 and the result of the determination made in the step S4 are YES may be, for example, a state where the vehicle 1 is stuck on the rough road and thus the vehicle 1 is stopped, and where the front wheels 2 slip and the rear wheels 3 rock even when the upper limit torque is applied and vice versa. Note that there is sometimes a case where the rear wheels 3 do not rock even when the front wheels 2 slip and the upper limit torque is outputted to the rear wheels 3, such as a case where the vehicle 1 accelerates with the front wheels 2 being slipped. Hence, in one implementation, the resonance switcher 205 may make a determination as to whether the rocking is generated on the basis of the outputs derived from the wheel speed sensors 15a and 15b and the torque outputted to the front wheels 2 or the rear wheels 3. In one specific but non-limiting implementation, the resonance switcher 205 may determine that the rear wheels 3 rock, when the output derived from the wheel speed sensor 15b directed to the rear wheels 3 indicates the speed of zero (or indicates the speed which is close to zero) and the torque of the rear wheels 3 reaches the upper limit torque. The resonance switcher 205 may also determine the rocking of the front wheels 2 on the basis of a condition similar to the condition described above. Performing such a method of determining the rocking increases an accuracy of detection of the rocking of the front wheels 2 or the rear wheels 3. Further, in one implementation where the method of determining the rocking is employed, the process of determining the slip performed in the step S3 may be omitted.

After the process makes the transition to step S5, the resonance switcher 205 may set the target amplitude of the resonance controller, i.e., the front resonance controller 203 or the rear resonance controller 204, that is directed to the non-slipped drive wheels, to a predetermined value that is larger than zero (step S5). For example, when the non-slipped drive wheels are the front wheels 2, the front resonance controller 203 is switched to the resonance-generating state and thus the vibration of the resonance frequency component is applied to the instruction torque by the process of the step S5. This in turn generates the resonance in the front power transmitter 13, thereby generating, for the front wheels 2, the drive force that is equal to or greater than the upper limit torque illustrated in (C) of FIG. 4. When the non-slipped drive wheels are the rear wheels 3, the rear resonance controller 204 is switched to the resonance-generating state and thus the vibration of the resonance frequency component is applied to the instruction torque by the process of the step S5. This in turn generates the resonance in the rear power transmitter 14, thereby generating, for the rear wheels 3, the drive force that is equal to or greater than the upper limit torque illustrated in (C) of FIG. 4.

Thereafter, the resonance switcher 205 may make a determination on the state of the vehicle 1 on the basis of the pieces of information on the vehicle states and the pieces of information on the rotation speeds of the front wheels 2 and the rear wheels 3 (step S6). Further, the resonance switcher 205 may receive the amplitude evaluation value transmitted from the resonance controller, i.e., the front resonance controller 203 or the rear resonance controller 204, that is directed to the non-slipped drive wheels (step S7).

Thereafter, the resonance switcher 205 may make a determination as to whether the vehicle 1 is started on the basis of a result of the determination made in the step S6 (step S8). In one implementation, the resonance switcher 205 that performs the process in the step S8 may serve as the "start determiner". When a result of the determination made in the step S8 is NO, i.e., when the vehicle 1 is in a non-start state (step S8: NO), the resonance switcher 205 may make a determination as to whether duration from the establishment of the resonance-generating state, as a result of setting the target amplitude to the predetermined value in the step S5, is equal to or longer than a threshold period (step S9). In one implementation, the duration from the establishment of the resonance-generating state may be calculated on the basis of duration that is from a timing at which the amplitude evaluation value has become equal to or greater than a threshold (A1). Thereafter, when a result of the determination made in the step S9 is NO (step S9: NO), the resonance switcher 205 may make a determination as to whether the amplitude evaluation value is equal to or greater than a threshold (A2) (step S10). The threshold (A2) may be set to any large value to the extent not to raise a possibility of breakage of the front power transmitter 13 or the rear power transmitter 14 due to the resonance. The threshold (A1) may be set to any value that is smaller than the threshold (A2) and by which the front resonance controller 203 or the rear resonance controller 204 is determinable as being in the resonance-generating state. The resonance switcher 205 may return the process to the step S6 when a result of the determination made in the step S10 is NO (step S10: NO).

Note that the steps from S6 to S10 are a loop process. The resonance switcher 205 may terminate the loop process and allow the process to proceed to step S12 when the result of the determination made in the step S8 is YES, i.e., when the vehicle 1 is in a start state (step S8: YES). Further, the resonance switcher 205 may terminate the loop process and allow the process to proceed to step S11 when the result of the determination made in the step S9 or the step S10 is YES (step S9 or S10: YES).

When the vehicle 1 is determined as being started in the step S8, the resonance switcher 205 may acquire returning target amplitude and returning time that are based on the amplitude evaluation value received in the step S7 (step S12). In one implementation, the returning target amplitude may refer to target amplitude by which the vibration of the resonance frequency component is converged more promptly than a case where the target amplitude is set to zero, upon switching from the resonance-generating state to the resonance-restraining state. In one implementation, the returning time may refer to a time until the vibration of the resonance frequency component is converged when the return target amplitude is set, upon switching from the resonance-generating state to the resonance-restraining state. Note that, in one implementation, the proportional gain Kp and the derivative gain Kd of the PD control circuit 215, upon restraining the resonance, are both so optimized that the resonance frequency component is converged promptly in a situation where the degree of the resonance is small. Hence, in a situation where the relatively-large resonance is generated, it is possible to allow the resonance frequency component to be converged more promptly by setting the proportional gain Kp and the derivative gain Kd to their respective values that are different from the optimized values. The returning target amplitude may vary the base gain Ka to thereby set the proportional gain Kp and the derivative gain Kd that allow for more prompt convergence of the resonance in the situation where the relatively-large resonance is generated. For example, such returning target amplitude and returning time that are based on the amplitude evaluation value may be determined in advance by simulation, experiment, etc. Thus-determined returning target amplitude and returning time may be held in the resonance switcher 205 as control data.

After the returning target amplitude and the returning time are acquired in the step S12, the resonance switcher 205 may output the returning target amplitude to the resonance controller, i.e., the front resonance controller 203 or the rear resonance controller 204, that is directed to the non-slipped drive wheels (step S13). Thereafter, the resonance switcher 205 may wait for the returning time to elapse (step S14). The processes performed from the steps S12 to S14 allow, when the vehicle 1 has escaped from the rough road and thus started, the resonance of the thus-resonated power transmitter, i.e., the front power transmitter 13 or the rear power transmitter 14, to be converged more promptly. In one implementation, the resonance switcher 205 that performs the processes from the step S12 to the step S14 may serve as the "returning processor".

Meanwhile, a situation where the duration of the generation of the resonance is determined as being equal to or longer than the threshold period in the step S9, or a situation where the amplitude evaluation value is determined as being equal to or greater than the threshold in the step S10, can be regarded as a circumstance in which the vehicle 1 is unable to escape from the rough road even if the generation of the resonance is continued further and an adverse effect attributable to the resonance may possibly occur. In such a circumstance, the resonance switcher 205 may output the drive stop command to the front torque requiring unit 201 and the rear torque requiring unit 202 (step S11), and may end the resonance control process. As a result, the ECU 20 may stop outputting the instruction torque to each of the drive circuits 17a and 17b. In this case, for example, the vehicle 1 may be placed in a state in which the driving operation is not accepted unless the ECU 20 is restarted. In an alternative implementation, in the step S11, the resonance switcher 205 may output a command that reduces the drive torque to a lower value or perform a process that reduces the target amplitude to zero or a lower value, instead of issuing the drive stop command. In a yet alternative implementation, a process may be performed in the step S11 that reduces the target amplitude to zero or to a lower value in a way similar to that performed in the steps S12 and S13. Reducing the target amplitude to zero may be equivalent to outputting, from the resonance switcher 205, a command that switches relevant one of the front resonance controller 203 and the rear resonance controller 204 to the resonance-restraining state.

A description is given next of an example working and an example effect of the vehicle 1 and the ECU 20 according to one implementation.

In recent years, a four-wheel-drive electric vehicle has been proposed that has a front wheel motor and a rear wheel motor and is able to drive front wheels and rear wheels independently. Such an electric vehicle includes no propeller shaft that couples the front wheels and the rear wheels together. This prevents power derived from the front wheel motor from being used and thus leads to sole use of power derived from the rear wheel motor, i.e., causes a maximum output of the vehicle to be about half the maximum output obtained upon a normal situation, when the vehicle is stuck on a rough road and the front wheels idle accordingly, for example. Hence, an example situation where the front wheels idle due to the rough road may sometimes cause rocking of the rear wheels and the rear wheel motor attributed to insufficient drive force and may sometimes make starting of the vehicle difficult. Note that an example phenomenon in which the vehicle becomes unable to start due to the rough road can occur likewise for any other vehicle such as a two-wheel-drive electric vehicle, a two-wheel-drive engine vehicle, and a four-wheel-drive engine vehicle, besides the above-described four-wheel-drive electric vehicle in which the front wheels and the rear wheels are independent from each other.

In contrast, the control performed in the vehicle 1 and the ECU 20 according to one implementation makes it possible to increase a possibility of escaping from the rough road by generating the resonance of the front power transmitter 13 or the resonance of the rear power transmitter 14, even in a situation where the vehicle 1 is stuck on the rough road and is thus unable to start.

Further, according to one implementation, the resonance switcher 205 may automatically generate the resonance on the basis of the state of each of the drive wheels. Hence, it possible to prevent occurrence of a circumstance that the resonance is generated even though the generation of the resonance is unnecessary. In addition, the resonance switcher 205 may generate the resonance for the wheels that involve the rocking, in a situation where the front wheels 2 slip and the rear wheels 3 rock and vice versa. Hence, it is possible to limit the execution of the control that generates the resonance to a situation where the possibility of escaping from the rough road by means of the resonance is high, and thereby to prevent the ineffective generation of the resonance in any other situation.

Moreover, according to one implementation, the front resonance controller 203 and the rear resonance controller 204 each may include the amplitude evaluator 212 that evaluates the amplitude of the resonance. The front resonance controller 203 and the rear resonance controller 204 each may receive the target amplitude, and may so generate, on the basis of the target amplitude, that the resonance does not exceed the target amplitude. Hence, it is possible to avoid a circumstance in which the resonance becomes large and thus raises a possibility of breakage of any part.

In addition, according to one implementation, the resonance switcher 205 may output the drive stop command to stop the drive of the vehicle 1 when, with the start of the vehicle 1 being unconfirmed, the amplitude evaluation value becomes equal to or greater than the threshold or the predetermined duration elapses from the generation of the resonance. Hence, it is possible to restrain the ineffective resonance from continuing for a long time.

Further, according to one implementation, the resonance switcher 205 may perform the control process that is directed to the returning (i.e., the process from the step S12 to the step S14) and that allows the resonance to be converged more promptly than that in the regular resonance-restraining state, upon switching the state from the state in which the resonance is generated to the state in which the resonance is to be restrained. Hence, it is possible to allow the resonance to be converged more promptly when the vehicle 1 is escaped from the rough road by means of the resonance.

Although some example implementations of the technology have been described in the foregoing with reference to the accompanying drawings, the technology is by no means limited to the implementations described above. For example, the foregoing implementation has been described by referring to a non-limiting example in which the resonance switcher 205 may so perform the switching as to allow the resonance to be generated, on the basis of the state of the drive wheels, i.e., the front wheels 2 and the rear wheels 3. In an alternative implementation, the resonance switcher may perform the switching to the state in which the resonance is generated, on the basis of an operation command that is directed to the generation of the resonance and given by an occupant. In a yet alternative implementation, the resonance switcher may perform the switching to the state in which the resonance is generated, on the basis of the operation command directed to the generation of the resonance and given by the occupant and one of the states of the drive wheels and the state of the vehicle 1. In such alternative implementations, a device, such as an operation button, directed to the generation of the resonance may be provided at a driver's seat or any other suitable location to allow the occupant to input the operation command directed to the generation of the resonance.

The foregoing implementation has been described by referring to a non-limiting example in which the resonance control according to one implementation is applied to the vehicle including the front wheels driven by the power and the rear wheels driven by the power that is independent from the power transmitted to the front wheels. The resonance control according to one implementation, however, may be applied to any vehicle in which the power is transmitted only to the front wheels or to the rear wheels. In such an alternative implementation, the resonance switcher may perform a control that allows for the generation of the resonance when any drive wheel rocks, for example. Further, any implementation of the technology may be applied to any vehicle having both a motor directed to running and an engine, or to any vehicle having only the engine as a drive source. Any implementation of the technology may also be applied to a vehicle in which three or more drive wheels are driven by their respective running-use motors that are independent from each other, such as an in-wheel motor vehicle.

The foregoing implementation has been described by referring to a non-limiting configuration in which the resonance is generated for the drive wheels that involve the rocking when one of the two sets of drive wheels that are driven independently from each other, i.e., the front wheels 2 and the rear wheels 3, slips and the other rocks. In an alternative implementation, a configuration may be employed in which the resonance is generated for one or both of the two sets of drive wheels when both of the two sets of drive wheels rock.

The foregoing implementation employs a non-limiting configuration in which the resonance is generated by varying the proportional gain Kp and the derivative gain Kd, directed to the restraining of the resonance, of the PD control circuit 215 from their optimal values. An alternative implementation, however, may employ the following configuration as an example of a configuration that generates the resonance. Namely, a configuration may be employed in which, while adding a signal on the resonance frequency component to the instruction torque, the signal on the resonance frequency component to be added to the instruction torque is adjusted by detecting the resonance amplitude and so performing a feedback control that the resonance amplitude is converged to the target amplitude. In such an alternative implementation, the resonance amplitude may be detected by detecting a strain of any power transmitter by means of a device such as a strain sensor.

The foregoing implementation has been described by referring to a non-limiting configuration that performs the evaluation on the amplitude of the resonance, as a configuration that evaluates an amount of vibration of the resonance. In an alternative implementation, however, a configuration may be employed that evaluates the amount of vibration on the basis of the amplitude of the resonance and duration of the resonance.

The foregoing implementation has been described by referring to a non-limiting example in which the resonance switcher 205 outputs the returning target amplitude in order to achieve the more prompt convergence of the resonance when the vehicle 1 has started by means of the generation of the resonance. In an alternative implementation, however, a feedback circuit directed to the returning may be provided separately, which may be activated to allow for the more prompt convergence of the resonance directed to the returning. Any other part illustrated in one implementation of the technology may be variously modified on an as-necessary basis as alternative implementations of the technology, insofar as they fall within the scope of the technology.

The ECU 20 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the ECU 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 20 illustrated in FIGS. 1 and 2.

It should be appreciated that modifications and alterations may be made by persons skilled in the art without departing from the scope as defined by the appended claims. The technology is intended to include such modifications and alterations insofar as they fall within the scope of the appended claims or the equivalents thereof.

The invention claimed is:

1. A control apparatus of a vehicle, the vehicle being provided with a drive wheel including a first drive wheel and a second drive wheel, a drive unit including a first drive unit configured to generate the power directed to the first drive wheel and a second drive unit configured to generate the power directed to the second drive wheel on a basis of a torque command, and a power transmitter configured to transmit the power derived from the drive unit to the first and second drive wheel, the control apparatus being mounted on the vehicle, the control apparatus comprising:

a resonance controller configured to output the torque command, and control resonance of the power transmitter by utilizing the torque command; and a resonance switcher configured to switch a state of the resonance controller between a resonance-restraining state that restrains the resonance and a resonance-generating state that generates the resonance, wherein the resonance switcher is configured to switch, when one of the first drive wheel and the second drive wheel idles and the torque command directed to non-idling one of the first drive wheel and the second drive wheel reaches an upper limit, the state of the resonance controller which is directed to the non-idling one of the first drive wheel and the second drive wheel to the resonance-generating state.

2. The control apparatus of the vehicle according to claim 1, wherein the resonance switcher is configured to switch the state of the resonance controller to the resonance-generating state, on a condition that the drive wheel involves the rocking and the torque command reaches an upper limit.

3. The control apparatus of the vehicle according to claim 1, wherein the power transmitter comprises a first power transmitter configured to transmit the power to the first drive wheel and a second power transmitter configured to transmit the power to the second drive wheel, the resonance controller comprises a first resonance controller configured to control the resonance of the first power transmitter and a second resonance controller configured to control the resonance of the second power transmitter, the resonance switcher is configured to switch, on a condition that one of the first drive wheel and the second drive wheel idles and the torque command directed to non-idling one of the first drive wheel and the second drive wheel reaches an upper limit, the state of one of the first resonance controller and the second resonance controller which is directed to the non-idling one of the first drive wheel and the second drive wheel to the resonance-generating state.

4. The control apparatus of the vehicle according to claim 1, further comprising an evaluator configured to evaluate an amount of vibration of the resonance, wherein the resonance controller is configured to control, upon the resonance-generating state, the generation of the resonance to cause an evaluation value derived from the evaluator to be a predetermined value.

5. The control apparatus of the vehicle according to claim 2, further comprising an evaluator configured to evaluate an amount of vibration of the resonance, wherein the resonance controller is configured to control, upon the resonance-generating state, the generation of the resonance to cause an evaluation value derived from the evaluator to be a predetermined value.

6. The control apparatus of the vehicle according to claim 3, further comprising an evaluator configured to evaluate an amount of vibration of the resonance, wherein the resonance controller is configured to control, upon the resonance-generating state, the generation of the resonance to cause an evaluation value derived from the evaluator to be a predetermined value.

7. The control apparatus of the vehicle according to claim 4, further comprising a start determiner configured to determine whether the vehicle is started, wherein the resonance switcher is configured to output a command that restrains the generation of the resonance, on a condition that the vehicle is determined by the start determiner as not being started and predetermined duration elapses from establishment of the resonance-generating state.

8. The control apparatus of the vehicle according to claim 5, further comprising a start determiner configured to determine whether the vehicle is started, wherein the resonance switcher is configured to output a command that restrains the generation of the resonance, on a condition that the vehicle is determined by the start determiner as not being started and predetermined duration elapses from establishment of the resonance-generating state.

9. The control apparatus of the vehicle according to claim 6, further comprising a start determiner configured to determine whether the vehicle is started, wherein the resonance switcher is configured to output a command that restrains the generation of the resonance, on a condition that the vehicle is determined by the start determiner as not being started and predetermined duration elapses from establishment of the resonance-generating state.

10. The control apparatus of the vehicle according to claim 1, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

11. The control apparatus of the vehicle according to claim 2, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

12. The control apparatus of the vehicle according to claim 3, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

13. The control apparatus of the vehicle according to claim 4, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

14. The control apparatus of the vehicle according to claim 5, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

15. The control apparatus of the vehicle according to claim 6, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

16. The control apparatus of the vehicle according to claim 7, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

17. The control apparatus of the vehicle according to claim 8, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

18. The control apparatus of the vehicle according to claim 9, further comprising a returning processor configured to perform correction on the torque command upon switching the state of the resonance controller from the resonance-generating state to the resonance-restraining state to attenuate the resonance more promptly than a case where the correction is not performed, the correction being directed to transition from the resonance-generating state to the resonance-restraining state and based on a magnitude of the resonance.

19. A control apparatus of a vehicle, the vehicle being provided with a first drive wheel and a second drive wheel, a drive unit including a first drive unit configured to generate the power directed to the first drive wheel and a second drive unit configured to generate the power directed to the second drive wheel on a basis of a torque command, and a power transmitter configured to transmit the power derived from the drive unit to the first and second drive wheel, the control apparatus being mounted on the vehicle, the control apparatus comprising
circuitry configured to:
output the torque command,
control resonance of the power transmitter by utilizing the torque command, and
switch a state of the control performed on the resonance of the power transmitter between a resonance-restraining state that restrains the resonance and a resonance-generating state that generates the resonance,
wherein the switch of the state of control, when one of the first drive wheel and the second drive wheel idles and the torque command directed to non-idling one of the first drive wheel and the second drive wheel reaches an upper limit, switches the state of the control which is directed to the non-idling one of the first drive wheel and the second drive wheel to the resonance-generating state.

20. A control apparatus of a vehicle, the vehicle being provided with a first drive wheel and a second drive wheel, a drive unit including a first drive unit configured to generate the power directed to the first drive wheel and a second drive unit configured to generate the power directed to the second drive wheel on a basis of a torque command, and a power transmitter configured to transmit the power derived from the drive unit to the first and second drive wheel, the control apparatus being mounted on the vehicle, the control apparatus comprising:
a memory storing a program;
a processor executing the program to:
output the torque command,
control resonance of the power transmitter by utilizing the torque command, and
switch a state of the control performed on the resonance of the power transmitter between a resonance-restraining state that restrains the resonance and a resonance-generating state that generates the resonance,
wherein the switch of the state of control, when one of the first drive wheel and the second drive wheel idles and the torque command directed to non-idling one of the first drive wheel and the second drive wheel reaches an upper limit, includes switching the state of the control which is directed to the non-idling one of the first drive wheel and the second drive wheel to the resonance-generating state.

* * * * *